United States Patent [19]

Tan-no et al.

[11] Patent Number: 5,646,082
[45] Date of Patent: Jul. 8, 1997

[54] CRYSTALLINE ALUMINOSILICATE, PROCESS FOR PRODUCING THE SAME, AND CATALYST EMPLOYING THE SAME FOR CATALYTIC CRACKING OF HYDROCARBON OIL

[75] Inventors: Masaki Tan-no, Saitama; Seiichi Harima, Tokyo; Mitsugu Tsujii, Chiba; Mitsuru Ohi, Saitama, all of Japan

[73] Assignees: Cosmo Research Institute; Cosmo Oil Co., Ltd., both of Tokyo, Japan

[21] Appl. No.: 471,201

[22] Filed: Jun. 6, 1995

Related U.S. Application Data

[63] Continuation of Ser. No. 80,308, Jun. 24, 1993, abandoned.

[51] Int. Cl.⁶ .................................................. B01J 29/08
[52] U.S. Cl. ................................. 502/65; 502/73; 502/79; 502/85; 423/713; 423/DIG. 21
[58] Field of Search ........................ 423/700, 713, 423/718, DIG. 21; 502/79, 85, 73, 65

[56] References Cited

U.S. PATENT DOCUMENTS

| | | | |
|---|---|---|---|
| 4,125,591 | 11/1978 | Lindsley | 502/79 |
| 4,357,265 | 11/1982 | Chiang | 502/79 X |
| 4,415,439 | 11/1983 | Chiang | 208/120 |
| 4,480,047 | 10/1984 | Beck et al. | 502/65 |
| 4,576,711 | 3/1986 | Ward et al. | 208/111 |
| 4,661,239 | 4/1987 | Steigleder | 208/111 |
| 4,663,025 | 5/1987 | Fu | 208/120 |
| 4,840,930 | 6/1989 | LaPierre et al. | 502/79 |
| 4,874,729 | 10/1989 | Klazinga | 502/61 |
| 4,874,730 | 10/1989 | Klazinga | 502/61 |
| 4,879,019 | 11/1989 | Ward | 208/111 |
| 5,013,699 | 5/1991 | Vassilakis et al. | 502/73 |
| 5,037,531 | 8/1991 | Bundens et al. | 208/120 |
| 5,053,372 | 10/1991 | Brownscombe | 502/60 |
| 5,069,890 | 12/1991 | Dai et al. | 723/713 |
| 5,087,348 | 2/1992 | Dai et al. | 208/111 |
| 5,227,352 | 7/1993 | Tsujii et al. | 502/65 |
| 5,288,396 | 2/1994 | Ward | 208/111 |

FOREIGN PATENT DOCUMENTS

| | | | |
|---|---|---|---|
| 0074501 | 3/1983 | European Pat. Off. | 502/79 |
| 0168089 | 9/1984 | Japan | 502/79 |
| 0972831 | 10/1964 | United Kingdom | 423/DIG. 21 |

*Primary Examiner*—Mark L. Bell
*Assistant Examiner*—David Sample
*Attorney, Agent, or Firm*—Sughrue, Mion, Zinn, Macpeak & Seas

[57] ABSTRACT

The present invention disclosed a crystalline aluminosilicate which has the following characteristics:

(A) an $SiO_2/Al_2O_3$ molar ratio as determined by chemical analysis of from 5 to 11;

(B) a unit cell dimension of from 24.45 to 24.55 Å;

(C) a molar ratio of the Al contained in the zeolite framework to the total Al contained in the aluminosilicate of from 0.3 to 0.9 calculated by the equations specified in the specification;

(D) an alkali metal content, in terms of oxide, of from 0.02 to 1.5% by weight;

(E) an X-ray diffraction pattern having peaks characteristic of zeolite Y; and (F) an ignition loss of from 0.5 to 20% by weight; and a process for producing the same, and a catalyst employing the same for the catalytic cracking of a hydrocarbon oil and the said catalyst which contains at least one metal selected from rare earth metals and alkaline earth metals.

6 Claims, 1 Drawing Sheet

CRYSTALLINE ALUMINOSILICATE, PROCESS FOR PRODUCING THE SAME, AND CATALYST EMPLOYING THE SAME FOR CATALYTIC CRACKING OF HYDROCARBON OIL

This is a continuation of application Ser. No. 08/080,308 filed Jun. 24, 1993 now abandoned.

FIELD OF THE INVENTION

The present invention relates to a crystalline aluminosilicate, a process for producing the same, and a catalyst for the catalytic cracking of a hydrocarbon oil which catalyst employs the aluminosilicate. More particularly, this invention relates to a crystalline aluminosilicate having excellent hydrothermal stability, a process for producing the aluminosilicate by applying a thermal load to stabilized zeolite Y under specific conditions, and a catalytic cracking catalyst employing the aluminosilicate which catalyst provides excellent catalytic conversion of a bottom fraction (heavy distillate oil), is excellent in selectivity for hydrogen and coke (i.e., capable of effectively controlling the generation of hydrogen and coke (forming a lower amount of hydrogen and coke)), and can yield gasoline having a low olefin content.

BACKGROUND OF THE INVENTION

In the petroleum refining industry, the role of the catalytic cracking process generally is to crack a hydrocarbon oil by bringing it into contact with a catalyst to thereby produce cracked gasoline in high yield.

As the feedstock oil, vacuum gas oil (VGO) has mostly been used conventionally.

Recently however, the crude oil situation and the trend of the petroleum product market have led to a growing desire for a process in which bottoms (heavy distillate) obtained in an atmospheric or vacuum distillation (hereinafter referred to as bottoms) are also used as the feedstock oil to be cracked and light cracked oil fractions (hereinafter referred to as LCO) are increased simultaneously with the gasoline fraction.

Catalysts designed for attaining improved conversion of bottoms have been proposed which include a catalyst comprising a mixture of silica-alumina, γ-alumina, boehmite, or the like as an inorganic oxide matrix which is one of the catalyst components and stabilized zeolite Y, and a catalyst comprising a mixture of an alumina-magnesia matrix and a crystalline aluminosilicate (see JP-A-58-163439 and JP-A-1-111446). (The term "JP-A" as used herein means an "unexamined published Japanese patent application".)

On the other hand, the present inventors proposed a crystalline aluminosilicate which has a specific structure obtained by applying a certain thermal load to a specific stabilized zeolite Y (JP-A-4-59616).

DESCRIPTION OF THE PRIOR ART

However, the catalytic cracking of a bottom using a catalyst containing a matrix of silica-alumina or the like for attaining improved conversion has a problem of providing an increased amount of hydrogen and coke and this not only reduces the yields of the desired liquid products such as gasoline and LCO, but also results in difficulties in operating the unit.

The above process is also disadvantageous in gasoline quality because the gasoline has an increased olefin content, which necessarily lowers the quality.

On the other hand, when a catalyst containing the crystalline aluminosilicate having a specific structure is used, which aluminosilicate was proposed by the present inventors, a bottom can be cracked while controlling the generation of hydrogen and coke and an olefin content lower than conventional ones can be attained. Thus, quality deterioration can be avoided.

However, the technique described in JP-A-4-59616 necessitates a high temperature treatment which should be conducted under severe conditions. Under these circumstances, there is a desire for a catalytic cracking catalyst which can be produced by a simpler method and which has performances equal to or higher than those of conventional cracking catalysts, that is, which provides high catalytic conversion and is capable of attaining a reduction in olefin content.

The present invention has been completed in order to satisfy such desire. Accordingly, an object of the present invention is to provide a crystalline aluminosilicate which has excellent hydrothermal stability and which, when used as a component of a catalyst for the catalytic cracking of a hydrocarbon oil, especially a bottom, brings about high catalytic conversion and can heighten the yields of gasoline and LCO while attaining a low olefin content in the gasoline and controlling the generation of hydrogen and coke. Other objects of the present invention are to provide a process for producing the aluminosilicate from stabilized zeolite Y and to provide the catalyst employing the aluminosilicate and having the properties described above.

SUMMARY OF THE INVENTION

As a result of intensive studies made to attain the aforementioned objects, the present inventors found that a crystalline aluminosilicate obtained from stabilized zeolite Y having specific properties by applying thereto a thermal load under specific conditions milder than those of JP-A-4-59616 has characteristic properties with respect to the molar ratio of the Al contained in the zeolite framework to the total Al, ignition weight loss, and unit cell dimension. It was also found that when a mixture of the crystalline aluminosilicate having such characteristic properties with an inorganic oxide matrix is used as a catalyst for the catalytic cracking of a hydrocarbon oil, especially a bottom, it shows an activity equal to or higher than that attained by the aforementioned prior art technique in which a high temperature load is applied, so that the mixture not only attains a reduced olefin content but also enables the oil to be efficiently cracked to yield gasoline and LCO in higher yields while effectively controlling the generation of hydrogen and coke. The present invention has been completed based on these findings.

The present invention provides, in the first aspect thereof, a crystalline aluminosilicate having the following characteristics:

(A) the $SiO_2/Al_2O_3$ molar ratio as determined by chemical analysis is from 5 to 11;

(B) the unit cell dimension is from 24.45 to 24.55 Å;

(C) the molar ratio of the Al contained in the zeolite framework to the total Al contained in the aluminosilicate is from 0.3 to 0.9, said molar ratio being calculated using equations (1) to (3) given below;

(D) the alkali metal content, in terms of oxide, is from 0.02 to 1.5% by weight;

(E) the X-ray diffraction pattern has characteristic peaks of zeolite Y; and (F) the ignition loss is from 0.5 to 20% by weight; and also provides a catalyst for the catalytic cracking of a hydrocarbon oil which catalyst employs the crystalline aluminosilicate.

$$N_{Al} = (a_0 - 2.425)/0.000868 \quad (1)$$

$a_0$: the unit cell dimension (nm)
$N_{Al}$: the number of Al atoms per unit cell $$(Si/Al) = (192 - N_{Al})/N_{Al} \quad (2)$$

192: the number of Si and Al atoms per unit cell of zeolite Y (Al in the zeolite framework)/(total Al) = [(Si/Al) determined by chemical analysis]/[(Si/Al) determined using equation (2)]  (3)

Equation (1) above is a quotation from H. K. Beyer et al., *J. Chem. Soc., Faraday Trans.*, 1, 1985, (81), p. 2899.

In the second aspect of the present invention, the present invention provides a catalyst for use in the catalytic cracking of a hydrocarbon oil comprising (i) the crystalline aluminosilicate described above or (ii) the crystalline aluminosilicate described above and an inorganic oxide matrix and, incorporated in the catalyst, at least one metal selected from rare earth metals and alkaline earth metals.

In the third aspect of the present invention, a process for producing the crystalline aluminosilicate according to the first aspect of the invention is provided which comprises calcining stabilized zeolite Y in a temperature range of from 400° to 590° C. for 5 to 300 minutes while controlling the decrease in the crystallinity of said stabilized zeolite Y to 20% or less, said stabilized zeolite Y initially having an $SiO_2/Al_2O_3$ molar ratio of from 5 to 11, a unit cell dimension of from 24.50 to 24.72 Å, and an alkali metal content in terms of oxide of from 0.02 to 1.5% by weight.

DETAILED DESCRIPTION OF THE INVENTION

The starting material for the crystalline aluminosilicate according to the present invention is stabilized zeolite Y which shows improved stability in crystallinity and which can be obtained by hydrothermally treating zeolite Y several times and, if required, further treating the resulting zeolite Y with at least one of a mineral acid such as hydrochloric acid, a base such as sodium hydroxide, a salt such as potassium fluoride, and a chelating agent such as ethylenediaminetetraacetic acid (EDTA).

The stabilized zeolite Y may, of course, be one obtained by treating zeolite Y with a silicon compound such as ammonium hexafluorosilicate [$(NH_4)_2SiF_6$] or silicon tetrachloride ($SiCl_4$) or one obtained by treating zeolite Y with a silicon-free compound such as EDTA or phosgene ($COCl_2$).

The stabilized zeolite Y for use as the starting material has an $SiO_2/Al_2O_3$ molar ratio of from about 5 to 11, preferably from 5.6 to 9, a unit cell dimension of about from 24.50 to 24.72 Å, preferably from 24.55 to 24.68 Å, and an alkali metal content in terms of oxide of about from 0.02 to 1.5% by weight, preferably about from 0.05 to 1.0% by weight.

The crystal structure of this stabilized zeolite Y is basically the same as that of natural faujasite-type zeolite.

Stabilized zeolite Y is generally represented by the following formula in terms of oxide molar proportion:

$$(0.02–1.0)R_{2/m}O \cdot Al_2O_3 \cdot (5–11)SiO_2 \cdot (5–8)H_2O$$

R: an ion selected from Na, K, and other alkali metal ions
m: the valence of R

Thus, the stabilized zeolite Y for use as a starting material in the present invention corresponds to those having a low $R_{2/m}O$ content, i.e., having an $R_{2/m}O$ proportion of from 0.0015 to 0.25 as shown in the formula.

That is, the stabilized zeolite Y for use in the present invention has the characteristics summarized in Table 1.

TABLE 1

| Characteristics | Range | Preferred Range |
|---|---|---|
| Bulk $SiO_2/Al_2O_3$ molar ratio as determined by chemical analysis | about 5 to 11 | about 5.6 to 9 |
| Unit cell dimension (Å) | about 24.50 to 24.72 | about 24.55 to 24.68 |
| Alkali metal content (wt %) (in terms of oxide) | about 0.02 to 1.5 | about 0.05 to 1.0 |

The crystalline aluminosilicate of the present invention which has the characteristics specified hereinabove can be obtained by applying a specific thermal load (hereinafter occasionally referred to as "heat shock") to the stabilized zeolite Y described above.

The thermal load may be applied by calcining the stabilized zeolite Y in a temperature range of about from 400° to 590° C., preferably about from 450° to 570° C., for a duration of about from 5 to 300 minutes, preferably about from 5 to 100 minutes, provided that the decrease in crystallinity is controlled at about 20% or less, preferably at about 15% or less.

If too low a temperature is used, the calcination fails to yield a crystalline aluminosilicate having the characteristics specified hereinabove. On the other hand, if the calcination is conducted at too high a temperature or for too long a duration, the crystal structure of the zeolite is destroyed and hence a crystalline aluminosilicate having the above-specified characteristics cannot be obtained.

In general, the heat shock is applied in either an electric furnace or a kiln under an air or nitrogen or vapor atmosphere.

A proper amount of moisture accelerates dealumination and hence a heat shock can be applied at relatively low temperatures within the range specified above.

It is desirable to conduct the heat shock application under such conditions that the crystal structure of the zeolite is not substantially destroyed. Specifically, the treatment is conducted under such conditions that the crystallinity of the stabilized zeolite Y decreases by about 20% or less, preferably about 15% or less.

The crystallinity of the stabilized zeolite Y is determined in accordance with ASTM D-3906 (Standard Test Method for Relative Zeolite Diffraction Intensities).

Illustratively stated, zeolite Y (having an Si/Al ratio of 5.0, a unit cell dimension of 24.58 Å, and an $Na_2O$ content of 0.3% by weight) is used as the standard material, and the crystallinity of the test material is expressed as the ratio of the test material's X-ray diffraction intensity to the standard material's X-ray diffraction intensity.

The decrease in crystallinity for the thermally shocked stabilized zeolite Y according to the present invention can then be calculated using the following equation.

$$\text{Decrease in crystallinity (\%)} = \frac{A - B}{A} \times 100$$

A: Crystallinity of the stabilized zeolite Y
B: Crystallinity of the thermally shocked crystalline aluminosilicate In the above equation, the thermally shocked crystalline aluminosilicate means the crystalline aluminosilicate obtained by applying a heat shock to stabilized zeolite Y; this applies hereinafter.

In applying a heat shock, the heating rate is not particularly limited. For example, the stabilized zeolite Y as the raw material may be placed in a furnace which has been heated to a temperature in the above-specified range. Alternatively, the stabilized zeolite Y may be placed in a furnace at room temperature and then gradually heated to the predetermined temperature.

The thermally shocked crystalline aluminosilicate may be mixed with an inorganic oxide matrix, as will be described later, before being subjected to the catalytic cracking of a hydrocarbon oil. Although the time when a heat shock is applied is not particularly limited, it preferably is prior to the mixing with the matrix for further effectiveness.

The application of a heat shock in the present invention should be distinguished from the heat treatment of catalysts which is performed under severe conditions in order to establish the simulated equilibrium state prior to the performance evaluation of the catalysts.

As described above, the thermally shocked crystalline aluminosilicate of the present invention is obtained by thermally treating stabilized zeolite Y. However, when zeolite Y is used so as to directly yield the crystalline aluminosilicate of this invention through heat treatment, the desired aluminosilicate cannot be obtained because the crystal structure is destroyed.

Although the reason why zeolite Y cannot be directly converted into the desired aluminosilicate has not been fully elucidated, it is presumed that in order to obtain the thermally shocked crystalline aluminosilicate of the present invention, the crystal structure of stabilized zeolite Y must be established first. That is, zeolite Y is heated to first convert its crystal structure to that of stabilized zeolite Y and, after the resulting crystal structure has become stable, the stabilized zeolite Y is then thermally treated.

The thermally shocked crystalline aluminosilicate of the present invention, which can be obtained by the method described above, is a novel crystalline aluminosilicate having the following characteristics.

That is, the crystalline aluminosilicate has a bulk $SiO_2/Al_2O_3$ molar ratio, as determined by chemical analysis, of about from 5 to 11, preferably about from 5.6 to 9.

The unit cell dimension of the crystalline aluminosilicate is about from 24.45 to 24.55 Å, preferably about from 24.45 to 24.53 Å. This unit cell dimension can be determined from X-ray diffraction peaks in accordance with ASTM D-3942/85. Too large values of this dimension result in poor hydrothermal resistance.

In the crystalline aluminosilicate, the molar ratio of the Al contained in the zeolite framework to the total Al contained in the aluminosilicate is about from 0.3 to 0.9, preferably about from 0.4 to 0.8. The value of this molar ratio can be calculated from the $SiO_2/Al_2O_3$ molar ratio as determined by chemical analysis and from the unit cell dimension, using equations (1) to (3) given hereinabove (see the aforementioned H. K. Beyer et al., *J. Chem. Soc., Faraday Trans.*, 1, 1985, (81), 2899).

It should be noted that the molar ratio of the Al contained in the zeolite framework to the total Al can also be calculated using other equations, but the value thus determined differs from that obtained with equations (1) to (3).

provided that the bulk $SiO_2/Al_2O_3$ molar ratio is the same, too low a ratio of the Al content in the zeolite framework to the total Al results in a crystalline aluminosilicate having poor catalytic activity. Furthermore, since this situation signifies an increase in nonframework Al content, i.e., an increase in amorphous Al content, it results in the catalytic selectivity similar to that of an amorphous catalyst. Such a catalyst increases hydrogen and coke made.

On the other hand, if the molar ratio of the Al contained in the zeolite framework to the total Al is too high, this poses a problem that the crystalline aluminosilicate shows poor catalytic conversion of bottoms although it can yield gasoline having a low olefin content.

The thermally shocked crystalline aluminosilicate has an alkali metal content, in terms of oxide, of about from 0.02 to 1.5% by weight, preferably about from 0.05 to 1.0% by weight.

Alkali metal contents below about 0.02% by weight in terms of oxide are undesirable because the crystal structure becomes apt to be damaged.

If too large an amount of alkali metal is present in the thermally shocked crystalline aluminosilicate, not only is the catalytic activity lowered, but also heavy metals such as nickel and vanadium, which are commonly present in the feedstock oil, particularly in heavy oil, are apt to deposit on the catalyst to decrease the activity.

The crystalline aluminosilicate of the present invention has an ignition loss of about from 0.5 to 20% by weight, preferably about from 1 to 10% by weight.

This ignition loss is determined using the following equation.

$$\text{Ignition loss (wt \%)} = L/W \times 100$$

L: Weight loss of the sample caused by placing it in 1,000° C. air atmosphere in electric furnace for 1 hour W: Initial weight of the sample (after dried at 110° C. for 24 hours, allowed to stand at room temperature in air for 1 week)

If the value of ignition loss is too high, the thermally shocked crystalline aluminosilicate is apt to hold a larger amount of water and hence has poor hydrothermal stability. Consequently, the hydrocarbon oil cracking catalyst of the present invention comes to have a reduced life.

The characteristic features of the thermally shocked crystalline aluminosilicate of the present invention, which has been obtained by applying a specific thermal load to stabilized zeolite Y as described above, reside in that it has a unit cell dimension of about from 24.45 to 24.55 Å, which is clearly smaller than the unit cell dimension of about from 24.50 to 24.72 Å for stabilized zeolite Y, and that it has a molar ratio of the Al contained in the zeolite framework to the total Al of about from 0.3 to 0.9 and also has an ignition loss of about from 0.5 to 20% by weight.

The characteristics of the thermally shocked crystalline aluminosilicate of the present invention are summarized in Table 2.

TABLE 2

| Characteristics | Range | Preferred Range |
| --- | --- | --- |
| Bulk $SiO_2/Al_2O_3$ molar ratio as determined by chemical analysis | about 5 to 11 | about 5.6 to 9 |
| Al in zeolite framework/ total Al atomic ratio | about 0.3 to 0.9 | about 0.4 to 0.8 |
| Unit cell dimension (Å) | about 24.45 to 24.55 | about 24.45 to 24.53 |
| Alkali metal content (wt %) (in terms of oxide) | about 0.02 to 1.5 | about 0.05 to 1.0 |
| Ignition loss (wt %) | about 0.5 to 20 | about 1 to 10 |

Figure 1:
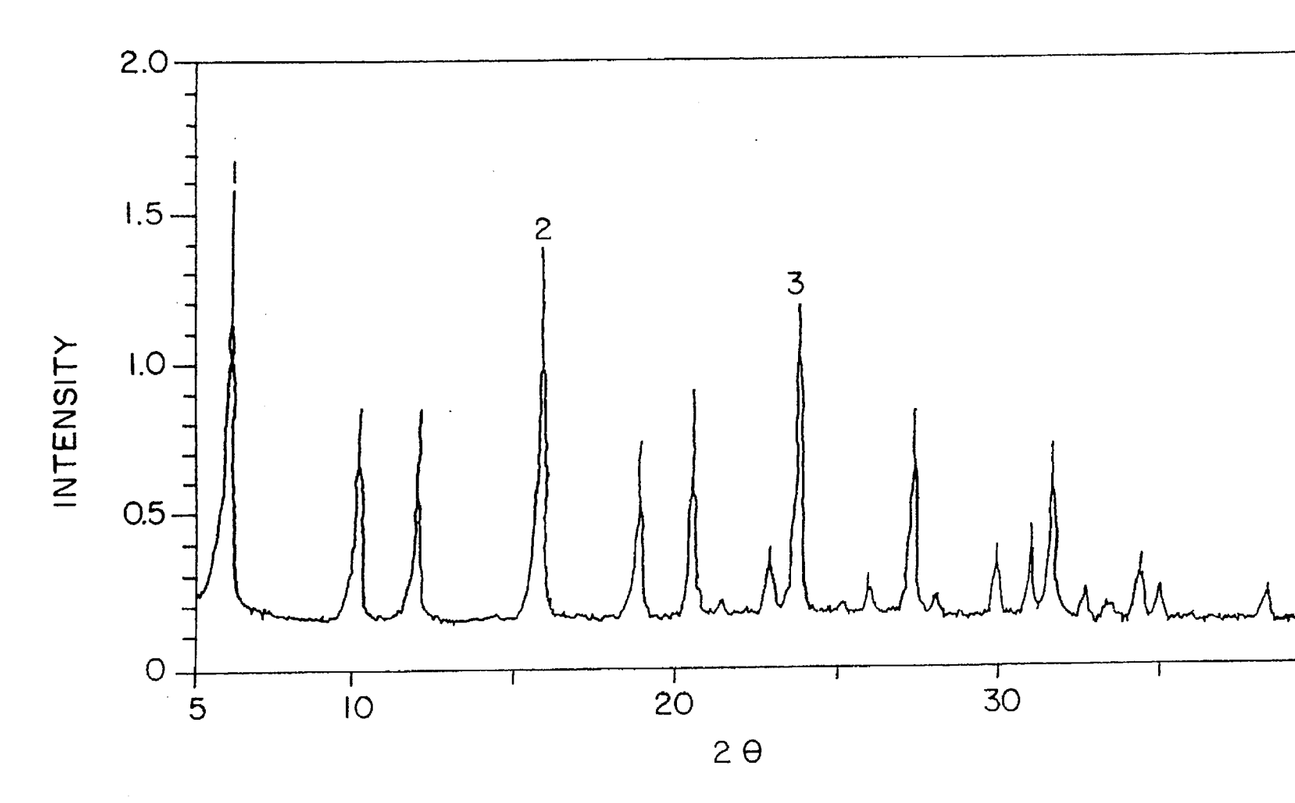
The sole FIGURE is an X-ray diffraction pattern of the crystalline aluminosilicate (HZ-1) obtained by applying a thermal shock thereto, taken with a Cu $K_\alpha$ radiation.

The thermally shocked crystalline aluminosilicate of the present invention gives an X-ray diffraction pattern as shown in FIG. 1.

In FIG. 1, numerals 1, 2, and 3 denote the three principal peaks at lattice spacings (d) of 14.1±0.2 Å, 5.61±0.1 Å, and 3.72±0.1 Å.

The peaks in the X-ray diffraction pattern of FIG. 1 are read as shown in Table 3.

TABLE 3

| Lattice spacing, d (Å) | Relative intensity $(I/I_0)$* |
| --- | --- |
| 14.1 ± 0.2 | s–vs |
| 8.6 ± 0.2 | m–s |
| 7.4 ± 0.1 | m–s |
| 5.61 ± 0.1 | s–vs |
| 4.70 ± 0.1 | m–s |
| 4.32 ± 0.1 | m–s |
| 3.86 ± 0.1 | w–m |
| 3.72 ± 0.1 | s–vs |
| 3.42 ± 0.1 | w–m |
| 3.26 ± 0.1 | m–s |
| 2.98 ± 0.1 | w–m |
| 2.87 ± 0.1 | w–m |
| 2.82 ± 0.1 | m–s |
| 2.72 ± 0.1 | w–m |
| 2.68 ± 0.1 | w |
| 2.60 ± 0.1 | w–m |
| 2.56 ± 0.1 | w |
| 2.35 ± 0.1 | w |

*vs: very strong; s: strong; m: medium; w: weak

The hydrocarbon oil cracking catalyst according to the present invention comprises a mixture of the thermally shocked crystalline aluminosilicate described above and an inorganic oxide matrix.

Examples of the inorganic oxide matrix include silica, alumina, boria, chromia, magnesia, zirconia, titania, silica-alumina, silica-magnesia, silica-zirconia, chromia-alumina, titania-alumina, titania-silica, titania-zirconia, alumina-zirconia, and mixtures thereof. The inorganic oxide matrix may further contain at least one clay selected from montmorillonite, kaolin, halloysite, bentonite, attapulgite, bauxite, and the like.

The mixture (i.e., the catalyst of the present invention) can be produced by any conventional method. In a representative method, the thermally shocked crystalline aluminosilicate is added into an aqueous slurry of an adequate inorganic oxide matrix, e.g., a silica-alumina hydrogel, silica sol, or alumina sol, and the resulting mixture is homogenized by stirring and then spray-dried to obtain a micro particle catalyst.

In such catalyst production, the ingredients may be mixed in such a proportion that the catalyst to be obtained will have a thermally shocked crystalline aluminosilicate content of about from 5 to 60% by weight, preferably about from 10 to 50% by weight, and an inorganic oxide matrix content of about from 40 to 95% by weight, preferably about from 50 to 90% by weight.

If the thermally shocked crystalline aluminosilicate content is below about 5% by weight, the effect expected of hydrocarbon oil cracking catalysts cannot be obtained. If the content thereof is higher than about 60% by weight, the proportion of the inorganic oxide matrix is so small that the catalyst has poor strength to cause problems concerning, e.g., unit operation, such as flying off of the catalyst and inclusion of the catalyst into the product.

According to one aspect of the present invention, the catalyst described above is also characterized as containing at least one metal selected from the group consisting of rare earth metals and alkaline earth metals.

Examples of the rare earth metals include scandium, yttrium, lanthanum, cerium, praseodymium, neodymium, samarium, and gadolinium. These may be used alone or as a mixture of two or more thereof.

Examples of the alkaline earth metals include beryllium, magnesium, calcium, strontium, barium, and radium. These may be used either alone or as a mixture of two or more thereof. Preferred of these are magnesium, calcium, and a mixture thereof.

It is possible to use a mixture of at least one of such rare earth elements with at least one of such alkaline earth metals. However, it is preferred to use the rare earth metals.

Embodiments of such catalyst containing at least one of the rare earth and alkaline earth metals include one in which the thermally shocked crystalline aluminosilicate, as one of the catalyst components, has been converted to a metal modified form by partly or wholly ion-exchanging the thermally shocked crystalline aluminosilicate with the metal (s) or by impregnating the thermally shocked crystalline aluminosilicate with the metal(s), and also include one in which the catalyst itself has been ion-exchanged or impregnated with the metal(s).

For the ion exchange or metal impregnation of either the thermally shocked crystalline aluminosilicate or the catalyst with at least one of the metals specified above, any conventional method may be used.

For example, either the ion exchange or the metal impregnation can be accomplished by a method in which the thermally shocked crystalline aluminosilicate or the catalyst is impregnated with or immersed in an aqueous solution of at least one of such compounds of lanthanum, magnesium, calcium, etc. as chlorides, nitrates, sulfates, and acetates, with heating if necessary.

In either the ion exchange or the metal impregnation, the amount of the metal(s) to be incorporated is about from 0.01 to 10% by weight, preferably about from 0.05 to 7% by weight, in terms of oxide based on the total amount of the catalyst, i.e., the crystalline aluminosilicate/inorganic oxide matrix mixture.

When the incorporated metal amount is expressed in terms of the degree of metal exchange for the crystalline aluminosilicate, it is about from 2 to 95%, preferably about from 5 to 80%. This metal exchange degree (%) is defined by the following equation.

Metal exchange degree (%)=A/B×100

A: Metal content of the aluminosilicate

B: Metal content of the aluminosilicate after all ion-exchangeable sites have been displaced by the metal Another feature of the aluminosilicate according to the present invention resides in that the incorporation of one or more of rare earth and alkaline earth metals into the aluminosilicate is easier than that into conventional aluminosilicates treated at temperatures as high as 600° to 1,200° C.

In other words, the aluminosilicate of the present invention is advantageous in that when this aluminosilicate and the conventional aluminosilicates are treated under the same conditions for incorporating a specific metal thereinto, the metal can be incorporated into the aluminosilicate of the present invention in a larger amount.

The metal ion exchange or metal impregnation described above enables the production of gasoline with a lower olefin content. This effect, however, is not brought about if the incorporated metal amount is too small. On the other hand, even if the incorporated metal amount is too large, the effect is not substantially heightened any more.

When the aluminosilicate of the present invention is compared in catalytic activity with conventional aluminosilicates treated at temperatures as high as 600° to 1,200° C., the former aluminosilicate shows far higher activity. The same activity as the conventional one can therefore be attained with the aluminosilicate of the invention in an amount smaller than the conventional ones.

The catalytic cracking of a hydrocarbon oil with the above-described catalyst of the present invention may be carried out by bringing the hydrocarbon oil (a mixture of hydrocarbons) which boils at a temperature higher than the boiling range for gasoline into contact with the catalyst.

Examples of the hydrocarbon mixture which boils at a temperature higher than the gasoline boiling range include gas oil fractions obtained by the atmospheric or vacuum distillation of crude oil, topping residue and vacuum residue. Examples thereof further include coker gas oil, solvent deasphalted oils, solvent deasphalted residues, oils extracted from tar sand or oil shale, and product oils from coal liquefaction.

In a commercial-scale catalytic cracking process, the catalyst of the present invention described above is continuously circulated through a catalytic cracking unit comprising two vessels, i.e., a vertically set cracking reactor and a catalyst regenerator.

The hot regenerated catalyst discharged from the catalyst regenerator is mixed with the hydrocarbon oil to be cracked, and the mixture is then led upward through the cracking reactor.

As a result of the cracking, a carbonaceous substance generally called coke deposits on the catalyst and thereby deactivates it. The deactivated catalyst is separated from the cracking products, subjected to stripping, and then transported into the catalyst regenerator.

The used catalyst circulated into the catalyst regenerator is regenerated by burning off the coke on the catalyst in air. The thus regenerated catalyst is then recirculated into the cracking reactor.

On the other hand, the cracking products are separated into dry gas, LPG, a gasoline fraction, and one or more heavy distillates such as light cycle oil (LCO), heavy cycle oil (HCO), and slurry oil.

These heavy distillates may, of course, be further reacted by recirculating them into the cracking reactor.

It is desirable to operate the cracking reactor of the above-described catalytic cracking unit under conditions of a pressure of about from atmospheric pressure to 5 Kg/cm$^2$, a temperature of about from 400° to 600° C., preferably about from 450° to 550° C., and a catalyst/feedstock hydrocarbon oil weight ratio of about from 2 to 20, preferably about from 4 to 15.

As described above in detail, the catalyst of the present invention, which contains the thermally shocked crystalline aluminosilicate of the invention obtained from stabilized zoolite Y by the process of the present invention in which a specific thermal load is applied to the raw material, is superior to conventional catalysts in activity in the catalytic cracking of a hydrocarbon oil, particularly a bottom, and can yield a gasoline having a low olefin content.

Furthermore, since the bottom-cracking ability of the catalyst of the present invention can be improved further, gasoline and light cycle oil (LCO), which corresponds to kerosene and gas oil, can be produced in higher yields while effectively controlling the formation of hydrogen and coke.

The present invention is now described in further detail by referring to the following Examples and Comparative Examples, but it should be understood that the present invention is not construed as being limited thereto. Unless otherwise indicated, all percents and parts in the following are by weight.

EXAMPLE 1

(Production of thermally shocked crystalline aluminosilicate HZ-1)

A stabilized zeolite Y having an $SiO_2/Al_2O_3$ molar ratio of 6, containing 0.58% by weight in terms of oxide of an alkali metal, and having a unit cell dimension of about 24.63 Å was calcined (heat shock) at 540° C. for 10 minutes in an air atmosphere in an electric furnace under ordinary pressure, thereby producing a thermally shocked crystalline aluminosilicate.

The product had the X-ray diffraction pattern characteristic of zeolite Y.

The crystallinity of the stabilized zeolite Y used as the raw material was 118% (with the crystallinity of zeolite Y as standard being taken as 100%), while that of the thermally shocked product was 100% (the decrease in crystallinity was 15%).

This thermally shocked crystalline aluminosilicate is designated as HZ-1, and the characteristics thereof are summarized in Table 4.

TABLE 4

| | |
|---|---|
| $SiO_2/Al_2O_3$ molar ratio | 6.0 |
| Al in zeolite framework/ total Al molar ratio | 0.46 |
| Unit cell dimension (Å) | 24.47 |
| Alkali metal content (wt %) | 0.58 |
| Ignition loss (wt %) | 5.80 |

EXAMPLE 2

(Production of thermally shocked crystalline aluminosilicate HZ-2)

A thermally shocked crystalline aluminosilicate was produced in the same manner as in Example 1 except that the calcination temperature was changed to 480° C.

The product had the X-ray diffraction pattern characteristic of zeolite Y.

The crystallinity of the thermally shocked product was 105% as calculated on the same basis as in Example 1 (the decrease in crystallinity was 11%).

This thermally shocked crystalline aluminosilicate is designated as HZ-2, and the characteristics thereof are summerized in Table 5.

TABLE 5

| | |
|---|---|
| SiO$_2$/Al$_2$O$_3$ molar ratio | 6.0 |
| Al in zeolite framework/ total Al molar ratio | 0.55 |
| Unit cell dimension (Å) | 24.51 |
| Alkali metal content (wt %) | 0.58 |
| Ignition loss (wt %) | 5.07 |

COMPARATIVE EXAMPLE 1

(Production of the high temperature thermally shocked crystalline aluminosilicate HZ-3)

A thermally shocked crystalline aluminosilicate was produced in the same manner as in Example 1 except that the calcination temperature was changed to 750° C.

The product had the X-ray diffraction pattern characteristics of zeolite Y.

The crystallinity of the thermally shocked product was 94% as calculated on the same basis as in Example 1 (the decrease in crystallinity was 20%).

This thermally shocked crystalline aluminosilicate is designated as HZ-3, and the characteristics thereof are summarized in Table 6.

TABLE 6

| | |
|---|---|
| SiO$_2$/Al$_2$O$_3$ molar ratio | 6.0 |
| Al in zeolite framework/ total Al molar ratio | 0.32 |
| Unit cell dimension (Å) | 24.41 |
| Alkali metal content (wt %) | 0.58 |
| Ignition loss (wt %) | 3.38 |

EXAMPLE 3 AND COMPARATIVE EXAMPLES 2 AND 3

(Evaluation of hydrothermal stability and exchanged ion amount for aluminosilicates)
(Evaluation of Hydrothermal Stability)

Aluminosilicate HZ-2 according to the present invention was evaluated for hydrothermal stability along with HZ-3 and the starting material, stabilized zeolite Y, for comparison. The evaluation was conducted under the following conditions, for determining which the actual use conditions in commercial unit were taken in account. The results are summarized in Table 7.

Conditions

Temperature: 600,700°, and 800° C.

Atmosphere: 100% steam

Duration: 5.0 hours

Evaluation item: After the treatment of the above duration, the aluminosilicate was checked for (1) a change in crystallinity, and (2) a change in unit cell dimension.

TABLE 7

| | Example 3 HZ-2 | Comparative Example 2 HZ-3 | Comparative Example 3 Starting material (Stabilized Zeolite Y) |
|---|---|---|---|
| SiO$_2$/Al$_2$O$_3$ molar ratio | 6.0 | 6.0 | 6.0 |
| Crystallinity (%) | 105 | 94 | 118 |

TABLE 7-continued

| | Example 3 HZ-2 | Comparative Example 2 HZ-3 | Comparative Example 3 Starting material (Stabilized Zeolite Y) |
|---|---|---|---|
| 600° C. treatment | 102 | 95 | 110 |
| 700° C. treatment | 100 | 96 | 81 |
| 800° C. treatment | 94 | 94 | 55 |
| Unit cell dimension (Å) | 24.51 | 24.41 | 24.63 |
| 600° C. treatment | 24.39 | 24.36 | 24.38 |
| 700° C. treatment | 24.36 | 24.34 | 24.34 |
| 800° C. treatment | 24.34 | 24.29 | 24.25 |

The results show that HZ-2, to which a thermal load had been applied under the conditions specified in the present invention, had excellent hydrothermal stability. That is, it was almost equal to HZ-3 in hydrothermal stability and provided a slighter change in both crystallinity and unit cell dimension than stabilized zeolite Y at higher treating temperatures.

(Evaluation of Exchanged Ion Amount)

Using lanthanum as a rare earth element, the amount of ion exchanged under the same conditions given below was determined. The results are shown in Table 8.

Conditions

Ion exchange solution: 500 ml of 0.2N LaCl$_3$.7H$_2$O solution

Treating temperature: 60° C.

Exchange duration: 15 minutes

Amount of aluminosilicate: 20 g

TABLE 8

| Aluminosilicate | HZ-2 (Example 3) | HZ-3 (Comparative Example 2) |
|---|---|---|
| La$_2$O$_3$ (wt %) | 3.07 | 2.27 |

Table 8 shows that a larger La$_2$O$_3$ amount is attained with the aluminosilicate of the present invention, that is, the incorporation of the rare earth metal into the aluminosilicate of the invention is easier.

EXAMPLE 4

(Preparation of catalyst A)

A mixture of 2,315 g of water and 2,335 g of a 30 wt % silica sol was prepared with stirring, and sulfuric acid was added thereto to adjust the pH to 1.8. Thereto were then added 1,736 g (dry basis) of kaolin, 1,042 g (dry basis) of the HZ-1 obtained in Example 1, and 3,000 g of water. The resulting mixture was homogenized by stirring.

The mixture thus obtained was spray-dried to yield a micro particle, which was then washed with 25 liters of distilled water.

The resulting powder was dried in air at 115° C. for 16 hours, thereby obtaining a catalyst according to the present invention (hereinafter referred to as catalyst A).

EXAMPLE 5

(Preparation of catalyst B)

The same procedures as in Example 4 were conducted except that the HZ-2 obtained in Example 2 was used in place of HZ-1. Thus, a catalyst according to the present invention (hereinafter referred to as catalyst B) was obtained.

COMPARATIVE EXAMPLE 4

(Preparation of catalyst C)

The same procedures as in Example 4 were conducted except that the HZ-3 obtained in Comparative Example 1 was used in place of HZ-1. Thus, a comparative catalyst (hereinafter referred to as catalyst C) was obtained.

COMPARATIVE EXAMPLE 5

(Preparation of catalyst D)

The same procedures as in Example 4 were conducted except that the stabilized zeolite Y employed as a starting material in Example 1 was used in place of HZ-1. Thus, a comparative catalyst (hereinafter referred to as catalyst D) was obtained.

EXAMPLE 6

(Preparation of catalyst E)

A mixture of 2,315 g of water and 2,335 g of a 30 wt % silica sol was prepared with stirring, and sulfuric acid was added thereto to adjust the pH to 1.8. Thereto were then added 1,910 g (dry basis) of kaolin, 868 g (dry basis) of the HZ-1 obtained in Example 1, and 3,000 g of water. The resulting mixture was homogenized by stirring.

The mixture thus obtained was spray-dried to yield a fine powder as a catalyst precursor.

The whole precursor was subjected to ion exchange using 30 liters of an aqueous solution of a rare earth metal chloride which solution had a content of the chloride of 10 g per 100 ml. The rare earth metal chloride had the composition shown in Table 9; the same rare earth metal chloride was used in the following Examples and Comparative Examples. The ion exchange was conducted at about 90° C. for 30 minutes.

The powder was thereafter recovered by filtration, washed with water, and then dried in air at 115° C. for 16 hours, thereby obtaining a catalyst according to the present invention (hereinafter referred to as catalyst E).

TABLE 9

| Composition of the rare earth metal chloride (wt %, in terms of oxide) | | | |
|---|---|---|---|
| $CeO_2$ | $La_2O_3$ | $Nd_2O_3$ | $Pr_8O_{11}$ |
| 52.9 | 22.9 | 18.8 | 5.5 |

EXAMPLE 7

(Preparation of catalyst F)

A mixture of 2,315 g of water and 2,335 g of a 30 wt % silica sol was prepared with stirring, and sulfuric acid was added thereto to adjust the pH to 1.8. Thereto were then added 2,084 g (dry basis) of kaolin, 695 g (dry basis) of the HZ-2 obtained in Example 2, and 3,000 g of water. The resulting mixture was homogenized by stirring.

The mixture thus obtained was spray-dried to yield a fine powder as a catalyst precursor.

The whole precursor was subjected to ion exchange using 30 liters of an aqueous solution of the rare earth metal chloride which solution had a content of the chloride of 10 g per 100 ml. The ion exchange was conducted at about 90° C. for 30 minutes.

The powder was thereafter recovered by filtration, washed with water, and then dried in air at 115° C. for 16 hours, thereby obtaining a catalyst according to the present invention (hereinafter referred to as catalyst F).

COMPARATIVE EXAMPLE 6

(Preparation of catalyst G)

A mixture of 2,315 g of water and 2,335 g of a 30 wt % silica sol was prepared with stirring, and sulfuric acid was added thereto to adjust the pH to 1.8. Thereto were then added 1,669 g (dry basis) of kaolin, 1,111 g (dry basis) of the HZ-3 obtained in Comparative Example 1, and 3,000 g of water. The resulting mixture was homogenized by stirring.

The mixture thus obtained was spray-dried to yield a fine powder as a catalyst precursor.

The whole precursor was subjected to ion exchange using 30 liters of an aqueous solution of the rare earth metal chloride which solution had a content of the chloride of 10 g per 100 ml. The ion exchange was conducted at about 70° C. for 30 minutes.

The powder was thereafter recovered by filtration, washed with water, and then dried in air at 115° C. for 16 hours, thereby obtaining a comparative catalyst (hereinafter referred to as catalyst G).

COMPARATIVE EXAMPLE 7

(Preparation of catalyst H)

The same procedures as in Example 6 were conducted except that the HZ-3 obtained in Comparative Example 1 was used in place of HZ-1. Thus, a comparative catalyst (hereinafter referred to as catalyst H) was obtained.

COMPARATIVE EXAMPLE 8

(Preparation of catalyst I)

A mixture of 2,315 g of water and 2,335 g of a 30 wt % silica sol was prepared with stirring, and sulfuric acid was added thereto to adjust the pH to 1.8. Thereto were then added 1,805 g (dry basis) of kaolin, 975 g (dry basis) of the stabilized zeolite Y employed as a starting material in Example 1, and 3,000 g of water. The resulting mixture was homogenized by stirring.

The mixture thus obtained was spray-dried to yield a fine powder as a catalyst precursor.

The whole precursor was subjected to ion exchange using 30 liters of an aqueous solution of the rare earth metal chloride which solution had a content of the chloride of 10 g per 100 ml. The ion exchange was conducted at about 50° C. for 30 minutes.

The powder was thereafter recovered by filtration, washed with water, and then dried in air at 115° C. for 16 hours, thereby obtaining a comparative catalyst (hereinafter referred to as catalyst I).

EXAMPLE 8

(Preparation of catalyst J)

The same procedures as in Comparative Example 6 were conducted except that the HZ-1 obtained in Example 1 was used in place of HZ-3, thereby to obtain a catalyst precursor.

The whole precursor was subjected to ion exchange using 30 liters of an aqueous solution of the rare earth metal chloride which solution had a content of the chloride of 10 g per 100 ml. The ion exchange was conducted at about 50° C. for 30 minutes.

The powder was thereafter recovered by filtration, washed with water, and then dried in air at 115° C. for 16 hours, thereby obtaining a catalyst according to the present invention (hereinafter referred to as catalyst J).

COMPARATIVE EXAMPLE 9

(Preparation of catalyst K)

The same procedures as in Comparative Example 6 were conducted except that the ion exchange was conducted at about 60° C. for 30 minutes. Thus, a comparative catalyst (hereinafter referred to as catalyst K) was obtained.

Activity Test in Pilot Plant Unit

Catalysts A to K obtained above were evaluated with respect to the catalytic cracking properties on a hydrocarbon oil using a pilot plant unit. This unit was a scaled down version of a catalytic cracking plant actually used in commercial production, which was a circulation type fluidized bed reactor comprising a cracking reactor and a catalyst regenerator.

The catalysts tested were treated prior to the testing in a 100% stream atmosphere at 785° C. for 6 hours so that they reached a quasi-equilibrium state.

The feedstock oils used were a desulfurized vacuum gas oil for Examples 4, 5, 6, and 7 (catalysts A, B, E, and F) and Comparative Examples 4, 5, 6, 7, and 8 (catalysts C, D, G, H, and I) and a mixed oil composed of 70 wt % desulfurized vacuum gas oil and 30 wt % resid desulfurization product for Example 8 (catalyst J) and Comparative Example 9 (catalyst K). The test was conducted using catalysts A to K using the feedstock oil, at a reaction temperature of 500° C., while circulating the catalyst at a rate of 60 g/min. The catalyst/oil ratio (by weight) was varied 4 levels, i.e., 4, 7, 9.5, and 12.5, and from the results thus obtained, the results which yields 65% conversion were selected as the standard value for comparison.

For comparing the activities, the conversion values obtained at a catalyst/oil ratio of 7 were used.

The composition of each catalyst and the results obtained are summarized in Table 10, in which the catalysts have been divided into three groups for evaluation.

Group [I]

(Examples 4 and 5 and Comparative Examples 4 and 5)

This group comprises catalysts A and B according to the present invention, catalyst C containing an aluminosilicate thermally shocked at 750° C., and catalyst D containing stabilized zeolite Y used as starting material.

As Table 10 clearly shows, catalysts A and B each gave almost the same results as those obtained with catalyst C. That is, catalysts A and B attained (i) a high activity and (ii) low olefin content.

The above results indicate that the present invention has advantages that as compared with the conventional techniques, stabilized zeolite Y as a starting material can be treated at a lower temperature and catalyst production is easier because of, e.g., the less severe conditions for catalyst production.

Group [II]

(Examples 6 and 7 and Comparative Examples 6 to 8)

This group comprises catalysts containing rare earth metals.

These catalysts are catalysts E and F according to the present invention, catalysts G and H containing an aluminosilicate thermally shocked at 750° C., and catalyst I containing stabilized zeolite Y used as starting material.

A comparison of catalysts E and F with catalyst G shows that catalysts E and F needed lower aluminosilicate content to obtain the same activity and that they attained lower olefin contents. This means that the catalysts according to the present invention have a higher activity.

A comparison of catalysts E and F with catalyst H shows that catalysts E and F had a higher activity and attained lower olefin contents despite the fact that the aluminosilicate contents thereof were equal to or lower than that of catalyst H. Further, as compared also with catalyst I, catalysts E and F according to the present invention attained a higher activity and lower olefin contents. Moreover, it shows that catalysts E and F attained lower hydrogen and coke contents and were excellent in the bottom cracking ability.

The above results indicate that the present invention is effective in attaining a lower olefin content in gasoline and a higher catalytic activity than those attainable by the conventional techniques.

Group [III]

(Example 8 and Comparative Example 9)

This group comprises catalysts containing the same amount of the aluminosilicate and the rare earth metal used with a heavier feedstock oil.

Although the two catalysts were almost equal in product yield and olefin content, the catalyst according to the present invention was superior in activity.

TABLE 10

| Catalyst | | Example 4 A | Example 5 B | Comparative Example 4 C | Comparative Example 5 D | Example 6 E | Example 7 F |
|---|---|---|---|---|---|---|---|
| Aluminosilicate content | (wt %) | 30 | 30 | 30 | 30 | 25 | 20 |
| Kaolin content | (wt %) | 50 | 50 | 50 | 50 | 55 | 60 |
| Silica binder content | (wt %) | 20 | 20 | 20 | 20 | 20 | 20 |
| Rare earth metal exchange degree | (%) | — | — | — | — | 53 | 53 |
| Rare earth metal oxide amount | (wt %) | — | — | — | — | 1.64 | 1.67 |
| Results of cracking | | | | | | | |
| Conversion | (wt %) | 65.2 | 64.5 | 65.2 | 64.7 | 65.2 | 65.4 |
| Hydrogen | (wt %) | 0.16 | 0.17 | 0.17 | 0.18 | 0.13 | 0.12 |
| $C_1$-$C_2$ | (wt %) | 1.5 | 1.5 | 1.4 | 1.4 | 1.3 | 1.3 |
| LPG | (wt %) | 12.5 | 12.0 | 12.5 | 12.2 | 10.8 | 10.8 |
| Gasoline | (wt %) | 48.6 | 48.4 | 48.6 | 48.4 | 50.7 | 50.9 |
| LCO*[1] | (wt %) | 23.8 | 23.9 | 24.0 | 23.5 | 24.0 | 23.7 |
| HCO+*[2] | (wt %) | 11.0 | 11.6 | 10.9 | 11.8 | 10.8 | 10.9 |
| Coke | (wt %) | 2.5 | 2.5 | 2.5 | 2.6 | 2.3 | 2.3 |
| Olefins | (vol %) | 48.1 | 47.2 | 47.5 | 50.5 | 39.0 | 38.4 |
| Catalytic Activity*[3] | | 65 | 65 | 65 | 62 | 65 | 65 |
| Group for evaluation | | [I] | [I] | [I] | [I] | [II] | [II] |

TABLE 10-continued

| Catalyst | | Comparative Example 6 G | Comparative Example 7 H | Comparative Example 8 I | Example 8 J | Comparative Example 9 K |
|---|---|---|---|---|---|---|
| Aluminosilicate content | (wt %) | 32 | 25 | 28 | 32 | 32 |
| Kaolin content | (wt %) | 48 | 55 | 52 | 48 | 48 |
| Silica binder content | (wt %) | 20 | 20 | 20 | 20 | 20 |
| Rare earth metal exchange degree | (%) | 40 | 56 | 20 | 20 | 26 |
| Rare earth metal oxide amount | (wt %) | 1.15 | 1.36 | 1.18 | 0.79 | 0.81 |
| Results of cracking | | | | | | |
| Conversion | (wt %) | 65.0 | 65.0 | 66.1 | 66.4 | 66.2 |
| Hydrogen | (wt %) | 0.14 | 0.13 | 0.17 | 0.21 | 0.21 |
| $C_1$-$C_2$ | (wt %) | 1.5 | 1.8 | 1.6 | 1.7 | 1.8 |
| LPG | (wt %) | 11.3 | 10.8 | 11.7 | 13.7 | 13.2 |
| Gasoline | (wt %) | 49.8 | 50.1 | 49.8 | 46.6 | 46.4 |
| LCO*[1] | (wt %) | 23.7 | 23.8 | 22.1 | 24.4 | 24.2 |
| HCO+*[2] | (wt %) | 11.3 | 11.2 | 11.8 | 9.3 | 9.7 |
| Coke | (wt %) | 2.3 | 2.2 | 2.7 | 4.1 | 4.5 |
| Olefins | (vol %) | 44.0 | 43.7 | 47.4 | 45.9 | 45.0 |
| Catalytic Activity*[3] | | 66 | 62 | 62 | 66 | 64 |
| Group for evaluation | | [II] | [II] | [II] | [III] | [III] |

*[1]: Light cycle oil fraction having a boiling range of about 190 to 350° C.
*[2]: Heavy cycle oil fraction having a boiling range of from about 350° C.
*[3]: Conversion at a catalyst/oil ratio of 7.

While the invention has been described in detail and with reference to specific embodiments thereof, it will be apparent to one skilled in the art that various changes and modifications can be made therein without departing from the spirit and scope thereto.

What is claimed is:

1. A catalytic cracking catalyst for catalytic cracking of a hydrocarbon oil which catalyst comprises a crystalline aluminosilicate and an inorganic oxide matrix wherein at least one rare earth metal is incorporated in said crystalline aluminosilicate and said crystalline aluminosilicate has the following characteristics:

(A) an $SiO_2/Al_2O_3$ molar ratio as determined by chemical analysis of from 5 to 11;

(B) a unit cell dimension of from 24.45 to 24.55 Å;

(C) a molar ratio of the Al contained in the zeolite framework to the total Al contained in the aluminosilicate of from 0.3 to 0.9, said molar ratio being calculated using the following equations (1) to (3):

$$N_{Al} = (a_0 - 2.425)/0.000868 \quad (1)$$

where $a_0$ is the unit cell dimension (nm) and $N_{Al}$ is the number of Al atoms per unit cell, $$(Si/Al) = (192 - N_{Al})/N_{Al} \quad (2)$$

where 192 is the number of Si and Al atoms per unit cell of zeolite Y, and (Al in the zeolite framework)/total (Al)={(Si/Al) determined by chemical analysis}/{(Si/Al) determined by using equation (2)}(3);

(D) an alkali metal content, in terms of oxide, of from 0.02 to 1.5% by weight;

(E) an X-ray diffraction pattern having peaks characteristic of zeolite Y; and (F) an ignition loss of from 0.5 to 20% by weight.

2. The catalyst as claimed in claim 1, which comprises from 5 to 60% by weight of said crystalline aluminosilicate and from 40 to 95% by weight of the inorganic oxide matrix, and has a rare earth metal or alkaline earth metal content, in terms of oxide, of from 0.01 to 10% by weight based on the total amount of the mixture constituting the catalyst.

3. A catalytic cracking catalyst for catalytic cracking of a hydrocarbon oil wherein said catalyst comprises a crystalline aluminosilicate and an inorganic oxide matrix and, incorporated in said catalyst, is at least one rare earth metal wherein said crystalline aluminosilicate has the following characteristics:

(A) an $SiO_2/Al_2O_3$ molar ratio as determined by chemical analysis of from 5 to 11;

(B) a unit cell dimension of from 24.45 to 24.55 Å;

(C) a molar ratio of the Al contained in the zeolite framework to the total Al contained in the aluminosilicate of from 0.3 to 0.9, said molar ratio being calculated using the following equations (1) to (3):

$$N_{Al} = (a_0 - 2.425)/0.000868 \quad (1)$$

where $a_0$ is the unit cell dimension (nm) and $N_{Al}$ is the number of Al atoms per unit cell, $$(Si/Al) = (192 - N_{Al})/N_{Al} \quad (2)$$

where 192 is the number of Si and Al atoms per unit cell of zeolite Y, and (Al in the zeolite framework)/total (Al)={(Si/Al) determined by chemical analysis}/{(Si/Al) determined by using equation (2)}(3);

(D) an alkali metal content, in terms of oxide, of from 0.02 to 1.5% by weight;

(E) an X-ray diffraction pattern having peaks characteristic of zeolite Y; and (F) an ignition loss of from 0.5 to 20% by weight.

4. The catalyst as claimed in claim 3, comprising from 5 to 60% by weight of the crystalline aluminosilicate and from 40 to 95% by weight of the inorganic oxide matrix.

5. The catalyst as claimed in claim 3, wherein the rare earth metals are scandium, yttrium, lanthanum, cerium, praseodymium, neodymium, samarium, and gadolinium and the alkaline earth metals are beryllium, magnesium, calcium, strontium, barium, and radium.

6. The catalyst as claimed in claim 3, comprising from 5 to 60% by weight of the crystalline aluminosilicate and from 40 to 95% by weight of the inorganic oxide matrix, and has a rare earth metal or alkaline earth metal content, in terms of oxide, of from 0.01 to 10% by weight based on the total amount of the mixture constituting the catalyst.

* * * * *

UNITED STATES PATENT AND TRADEMARK OFFICE
CERTIFICATE OF CORRECTION

PATENT NO. : 5,646,082            Page 1 of 3
DATED      : July 8, 1997
INVENTOR(S) : Masaki Tan-No, et. al.

It is certified that error appears in the above-identified patent and that said Letters Patent is hereby corrected as shown below:

In column 17, at line 46, change

"$N_{Al} = (a_0 - 2.425)/0.000868 \qquad (1)$" to

--$N_{Al} = (a_0 - 2.425)/0.000868 \qquad (1)$--;

at line 50, change

"$(Si/Al) = (192 - N_{Al})/N_{Al} \qquad (2)$" to

--$(Si/Al) = (192 - N_{Al})/N_{Al} \qquad (2)$--; and at lines 54-56, change

"(Al in the zeolite framework)/total (Al) = {(Si/Al) determined by chemical analysis}/{(Si/Al) determined by using equation (2)}(3);" to --(Al in the zeolite framework)/total (Al) =

{(Si/Al) determined by chemical analysis}/

{(Si/Al) determined by using equation (2)} $\qquad (3)$;--.

UNITED STATES PATENT AND TRADEMARK OFFICE
CERTIFICATE OF CORRECTION

PATENT NO. : 5,646,082
DATED : July 8, 1997
INVENTOR(S) : Masaki Tan-No, et. al.

It is certified that error appears in the above-identified patent and that said Letters Patent is hereby corrected as shown below:

In column 18, at line 41, change

"$N_{Al} = (a_0 - 2.425)/0.000868$ (1)" to

--$N_{Al} = (a_0 - 2.425)/0.000868$ (1)--;

at line 46, change

"$(Si/Al) = (192 - N_{Al})/N_{Al}$ (2)" to

--$(Si/Al) = (192 - N_{Al})/N_{Al}$ (2)--; and

UNITED STATES PATENT AND TRADEMARK OFFICE
CERTIFICATE OF CORRECTION

PATENT NO. : 5,646,082
DATED : July 8, 1997
INVENTOR(S) : Masaki Tan-No, et. al.

It is certified that error appears in the above-identified patent and that said Letters Patent is hereby corrected as shown below:

at lines 51-53, change

"(Al in the zeolite framework)/total (Al) = {(Si/Al) determined by chemical analysis}/{(Si/Al) determined by using equation (2)}(3);" to --(Al in the zeolite framework)/total (Al) =

{(Si/Al) determined by chemical analysis}/

{(Si/Al) determined by using equation (2)}                    (3);--.

Signed and Sealed this

Tenth Day of February, 1998

*Attest:*

BRUCE LEHMAN

*Attesting Officer*           *Commissioner of Patents and Trademarks*